United States Patent
Stubkier

(10) Patent No.: US 10,990,918 B2
(45) Date of Patent: Apr. 27, 2021

(54) METHOD OF REGISTERING AN INSTALLED VALVE

(71) Applicant: AVK Holding A/S, Galten (DK)

(72) Inventor: Hans Bo Stubkier, Skanderborg (DK)

(73) Assignee: AVK HOLDING AS, Galten (DK)

( * ) Notice: Subject to any disclaimer, the term of this patent is extended or adjusted under 35 U.S.C. 154(b) by 0 days.

(21) Appl. No.: 16/847,740

(22) Filed: Apr. 14, 2020

(65) Prior Publication Data

US 2020/0356941 A1   Nov. 12, 2020

Related U.S. Application Data

(63) Continuation of application No. 16/565,414, filed on Sep. 9, 2019, now Pat. No. 10,685,315, which is a continuation of application No. 15/522,613, filed as application No. PCT/DK2014/050353 on Oct. 27, 2014, now Pat. No. 10,445,681.

(51) Int. Cl.
| | |
|---|---|
| *G06Q 10/08* | (2012.01) |
| *G06F 16/248* | (2019.01) |
| *G05B 19/4065* | (2006.01) |
| *G06K 19/06* | (2006.01) |
| *G06Q 10/06* | (2012.01) |
| *G06Q 30/06* | (2012.01) |

(52) U.S. Cl.
CPC ......... *G06Q 10/08* (2013.01); *G05B 19/4065* (2013.01); *G06F 16/248* (2019.01); *G06K 19/06028* (2013.01); *G06Q 10/06* (2013.01); *G06Q 30/06* (2013.01)

(58) Field of Classification Search
USPC ....................................................... 235/385
See application file for complete search history.

(56) References Cited

U.S. PATENT DOCUMENTS

2014/0231507 A1*   8/2014   O'Brien ................. G06Q 10/06
                                                        235/375

* cited by examiner

*Primary Examiner* — Rafferty D Kelly
(74) *Attorney, Agent, or Firm* — Cantor Colburn LLP

(57) ABSTRACT

A method of registering an installed valve (VLV) is disclosed,
the installed valve (VLV) having a marking (MA) associated to an identity (ID),
the method comprising the steps of
providing a mobile communication device (DEV), the mobile communication device (DEV) comprising a navigation satellite signal receiver (NSSR),
establishing a registration of the valve (VLV) by performing the following steps with the mobile communication device (DEV),
  reading the marking (MA) attached to the valve (VLV),
  establishing a valve location (VL) by means of the navigation satellite signal receiver (NSSR), and
  transmitting at least one data package (DP) to a central server (CS), said at least one data package (DP) comprising a representation of the marking (MA) or the associated identity (ID) and the established valve location (VL),
receiving at the central server (CS) said at least one data package (DP),
establishing at the central server (CS) a valve record (VR) associating the identity (ID) to the established valve location (VL), and
storing the valve record (VR) in a database (DB).
A digital photograph of the installed valve may also be included in the one or more data packages.

20 Claims, 9 Drawing Sheets

METHOD OF REGISTERING AN INSTALLED VALVE

CROSS REFERENCE TO RELATED APPLICATIONS

Figure 1:
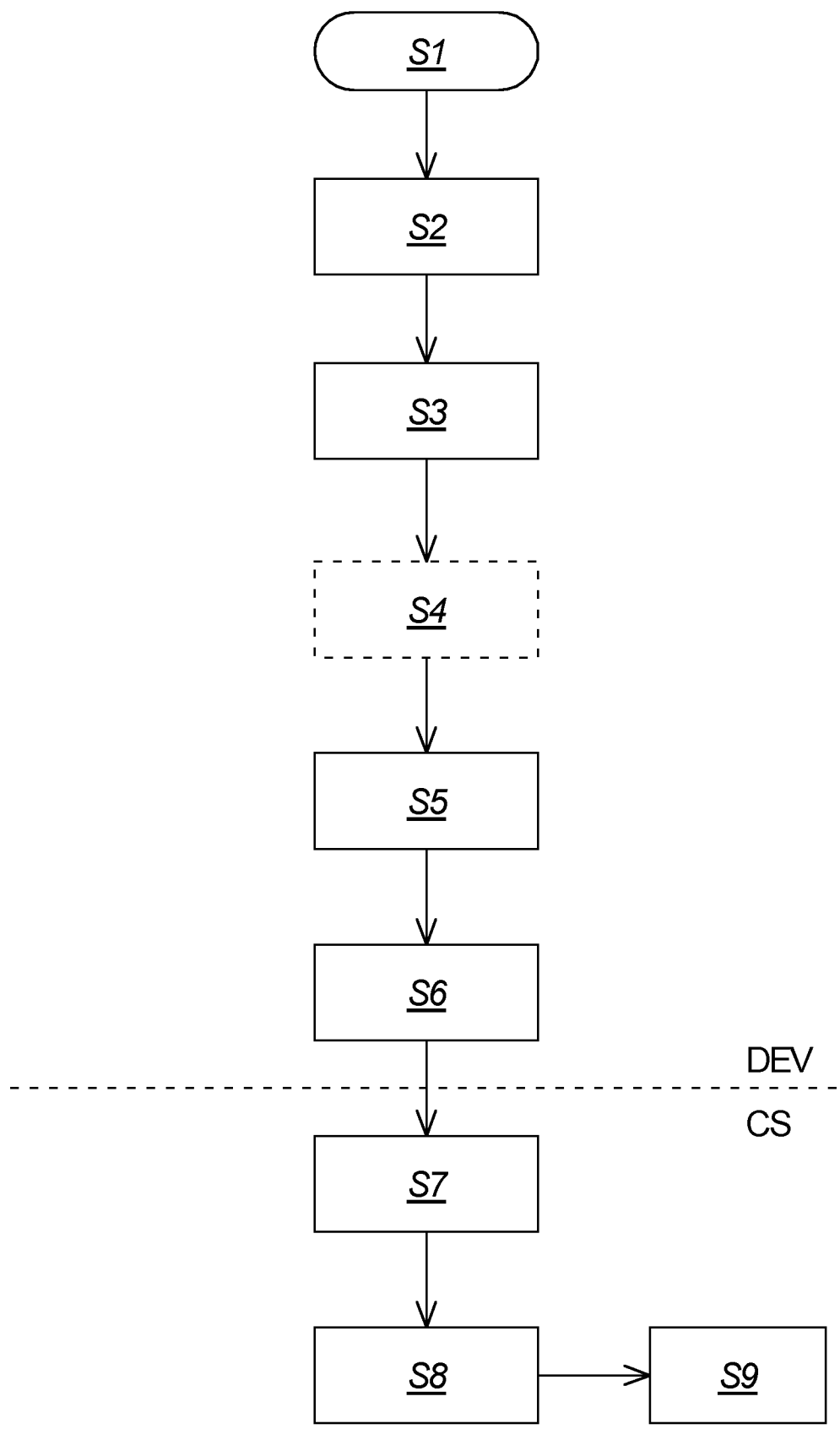

This application is a continuation of U.S. patent application Ser. No. 16/565,414 filed on Sep. 9, 2019, which is a continuation of U.S. patent application Ser. No. 15/522,613 filed on Apr. 27, 2017, now U.S. Pat. No. 10,445,681 granted on Oct. 15, 2019, which said application was filed as the U.S. national stage of International Patent Application Number PCT/DK2014/050353 filed on Oct. 27, 2014, the contents of all of which said applications are incorporated herein by reference in their entirety.

FIELD OF INVENTION

The invention relates to a method of registering a valve. The invention further relates to a valve locator. The invention further relates to mobile communication device. The invention further relates to a mapping. The invention further relates to a system comprising a number of hardware components.

BACKGROUND OF THE INVENTION

A problem relating to valves for waste water, water or gas is that the valves are typically widely distributed and sometimes also difficult to access. A further challenge is that such valves typically require regular service, depending on the type of the valve.

SUMMARY OF THE INVENTION

The invention relates in a first aspect to a method of registering an installed valve,
the installed valve having a marking associated to an identity,
the method comprising the steps of
providing a mobile communication device, the mobile communication device comprising a navigation satellite signal receiver,
establishing a registration of the valve by performing the following steps with the mobile communication device,
reading the marking attached to the valve,
establishing a valve location by means of the navigation satellite signal receiver, and
transmitting at least one data package to a central server, said at least one data package comprising a representation of the marking or the associated identity and the established valve location,
receiving at the central server said at least one data package,
establishing at the central server a valve record associating the identity to the established valve location, and
storing the valve record in a database.

According to an embodiment of the invention, it is possible to establish a relatively fault proof registration of valves into a central database, allowing e.g. an operator or an application service provider to locate and identify mounted valves. It is furthermore possible to perform the registration in a relatively easy and reliable way considering that the conditions for mounting of e.g. subterranean valves.

In the present context a navigation satellite signal receiver is a receiver adapted to receive a signal from a navigation satellite system, such as a global navigation satellite system, i.e. a satellite-based positioning system.

Examples of existing global navigation satellite system include the American (NAVSTAR) GPS-system and variants thereof, such as assisted GPS (aGPS) or differential GPS (dGPS) and Russian GLONASS.

Examples of planned systems or systems which may only be partly or regionally operative may include Chinese Beidou/Compass, European Galileo, Indian Regional Navigation Satellite System (IRNSS). It is likely that further navigational satellite systems will be developed, and such systems may of course also be used.

In some cases hybrid systems may be preferred, combining a navigation satellite system signal with one or more from the group consisting of WiFi, WiMAX, mobile phone signals such as GSM or LTE, use of IP addresses, network environmental data, or any combination thereof. One advantage of such hybrid systems may be that location may be acquired faster.

A record of a database is understood as a single structured data item comprising a number of fields. A preferred implementation of a valve record in the present context is as a record of a relational database. In the context of a relational database, a row—also called a record or tuple—represents a single, implicitly structured data item in a table. In simple terms, a database table can be thought of as consisting of rows and columns or fields. Each row in a table represents a set of related data, and every row in the table has the same structure.

In certain embodiments the step of reading the marking attached to the valve and the step of establishing a digital photograph of the installed valve by means of the camera is the same step. E.g. if the marking is a graphical tag, it may preferably be read by means of the camera; then the marking may in certain embodiments be read from the digital photograph of the installed valve. However, it should be understood that in many embodiments, these two steps are separate, e.g. when the mobile communication device is adapted to encode the marking, such as a graphical tag, itself, or if the graphical tag is too small and/or detailed to be read from the digital photograph of the installed valve.

Typically, several parties may be involved in the overall process of making and installing a valve. A valve manufacturer may sell valves to an operator, possibly through distributors.

In the present context, a valve operator is understood as an entity responsible for operating a pipe grid system comprising valves. The entity may also be the acquiring party, i.e. the legal owner of the valves. This may e.g. be a municipality owned entity. In many cases the valve operator may be a utility service provider.

The operator may then plan where the valve is to be installed, and a valve engineer performs the actual installing.

In the present context, a user is regarded as the person or team of persons mounting, registering or servicing the valves on-site. Also, the term valve engineer is used in the present context as a user or installer of the valve. The valve engineer may typically be subcontractor. The subcontractors may therefore vary over time and a new sub-contractor may have no history with the mounted valves in question.

The planning of the installation of the valve may also on many cases be subcontracted to other entities.

However, it should be understood that the valve engineer may be employed directly by the operator. Likewise, the planning of the installation of the valve may also be performed by the operator.

A solution according to an embodiment of the present invention may be hosted by an application service provider.

In the present context an application service provider is regarded as a central party hosting the valve registration service. The application service provider may e.g. be a valve manufacturer or e.g. an independent host.

It should be understood in the present context that the central server is distinct and typically distant from the mobile communication device. Receiving the one or more data packages at the central server may typically be from a communication system such as the internet, or a wireless network, such as a cellular telecommunication network.

In the present context a mobile communication device should be understood as including e.g. mobile telephones, tablets, PDAs, etc. The mobile communication device comprises a wireless communication arrangement for transmitting data packages. Typically such wireless communication arrangement may include an antenna for communication over mobile telecommunication networks.

One further advantage of an embodiment of the invention may be that a more precise registration of valves may be obtained while keeping the valve locations secret from third parties. If valves are subterranean, they may in some cases be marked physically to avoid breaking them unintentionally or to allow maintenance personal to easily locate the valves. However, in some regions it may be rather disadvantageous to visible mark valve locations, as this may be increase the risk of vandalism or sabotage. However, by means of the invention, the valves may be registered more precisely, including their locations, without necessitating giving locational information to third parties.

The marking may some embodiments be non-unique and may e.g. represent a non-unique identity, such as giving information about a type identification and/or a model, or about a serial number, which may in some cases reflect a particular batch of valves.

In the present context it should be understood that the term valve covers also a hydrant, e.g. a fire hydrant.

According to an advantageous embodiment of the invention, the mobile device comprises a camera and a navigation satellite signal receiver and wherein the method further comprises the steps of establishing a digital photograph of the installed valve by means of the camera, transmitting at least one data package to a central server, said at least one data package comprising a representation of the marking or the associated identity, the digital photograph of the valve, and the established valve location, and receiving at the central server said at least one data package, establishing at the central server a valve record associating the identity to the digital photograph of the valve and the established valve location.

According to an advantageous embodiment of the invention, the transmitting of at least one data package (DP) is initiated by a user and wherein the mobile communication device (DEV) automatically upon said initiation by the user establishes the at least one data package to be transmitted.

Advantageously and preferably, a user of the mobile communication device may initiate the transmitting of data for the valve record to be established centrally by a simple manual operation. The mobile device should preferably assist the user in the best possible way and an automated workflow, e.g. by means of a software application running on the mobile communication device.

According to an advantageous embodiment of the invention, the established valve location is automatically determined to be the last valid location determined on the basis of the signals received by the navigation satellite receiver.

An embodiment of the invention also addresses signal fall out, i.e. the problem of satellite based location in the sense that many valves are subterranean and the utilized mobile device is therefore subject to lack of receipt of navigation signals. According to an embodiment of the invention, the method involves an automatic valve location determined on the basis of some of the last validly received satellite signals. In this way, it may be possible for a user, typically the engineer, to establish the valve location even if the navigation satellite receiver does not receive utilizable signals.

In connection with the above it should be understood that the last valid location determined on the basis of the signals received by the navigation satellite receiver is the last valid location of the mobile communication device.

According to an advantageous embodiment of the invention, the established valve location is automatically determined to be one of the last valid locations determined on the basis of the signals received by the navigation satellite receiver.

A further advantageous way of determining the valve position is to base the location of signal received at some time prior to signal fall-out.

According to an advantageous embodiment of the invention, the established valve location is automatically determined to be calculated on the basis of signals received by the navigation satellite receiver subsequent to a signal fall out.

According to an advantageous embodiment of the invention, the established valve location is automatically determined to be calculated at least partly on the basis of signals received by the navigation satellite receiver subsequent to a signal fall out.

According to an advantageous embodiment of the invention, the established a valve location by means of the navigation satellite signal receiver is automatically corrected on the basis of signals received by the navigation satellite receiver subsequent to a signal fall out.

According to an advantageous embodiment of the invention, it may automatically be possible to correct already determined valve locations insofar the signals received by the navigation satellite receiver (NSSR) subsequent to a signal fall out are automatically considered applicable for an automatic correction. The automatic correction may be performed automatically by a software routine running on the mobile communication device. An automatic correction may e.g. also be followed by an automatic retransmission of the corrected valve location to the central server insofar the already transmitted and centrally registered valve location is considered invalid.

According to an advantageous embodiment of the invention, said marking is a unique marking.

One advantage of the above embodiment may be that each valve having a unique marking may be tracked. Thereby, for example, the time from sale of the valve until installation may in some cases be tracked. Also, a previously installed and registered valve may be, at subsequent inspections be identified as that same previously installed valve. Furthermore, a unique marking allows information about a unique identity, such as e.g. a unique serial number, to be incorporated in the marking.

One further advantage of unique markings may be that the valve record may be identified from the marking alone. This may e.g. be advantageous when inspecting a previously installed and registered valve, that the valve record may be requested upon reading the unique marking. Thereby, the valve inspector may receive relevant information for his inspection and/or may verify that the valve record is correct.

In certain alternative embodiments, the valve record may be identified even from a non-unique marking, such as a marking telling only the type identity of the valve, by using further information, such as a location.

According to an advantageous embodiment of the invention, said identity is a unique identity.

In some embodiments the identity may merely cover the type or model of the valve, whereas in many other embodiments, the identity may be unique, e.g. by reflecting a unique serial number or the like.

One advantage of using unique identities, such as a unique serial number, may be that it may be possible to track the particular valve from the unique serial number is associated with that valve and onwards. In some cases it may be possible to track the valve through at least part of the production, supply and/or assembly. In some cases it may be possible to track the valve after production and assembly, e.g. post sale, to track, for example, the time from sale until installation. The above advantages may be especially pronounced when the valve has a unique marking allowing the unique identity to be easily read, e.g. for a person installing the valve by reading the unique marking with the mobile communication device.

According to an advantageous embodiment of the invention, the registration is performed when installing the valve.

Typically, when installing a valve having a marking the method of the invention may be applied immediately after the installation or simultaneous with the installation. It should be understood that for instance the reading of the marking may actually be performed prior to installation of the valve, although in some cases it may be advantageous to perform all steps within more or less immediately after one another, i.e. after finishing the installation of the valve.

Similarly, the establishing of the valve location may in principle be done prior to installation. In any case, if the method is performed in a place with no or only low quality of navigation satellite signal, the establishing of the valve location may be based on the latest location available.

According to an advantageous embodiment of the invention, the registration is performed on a previously installed valve.

For example, the registration may be done performed during routine inspections.

According to an advantageous embodiment of the invention, the marking comprises additional information.

For example when using QR codes, additional information, other than information associating the marking with an identity, may be incorporated in the QR code. Such additional information may for instance relate to the valve type or model, components and/or materials thereof, information about how to install the valve, color-coding of the valve, etc. This information may thus assist the user when installing or checking the valve.

According to an advantageous embodiment of the invention, said additional information comprises information about the model or type of valve.

One advantage of the above embodiment may be that the valve engineer installing the valve may receive information about the valve from the marking without needing internet access or access to communication with external databases. Thereby, the valve engineer may be able to verify on the spot if the valve actually corresponds to the information gained from the marking.

This may for example be checking if the actual model or type corresponds to the information about the model or type from the marking. It may also be information which does not necessitate an expert, such as e.g. the color of the valve.

If the valve engineer identifies an error, i.e. a mismatch between the information from the marking, and the actual valve, he may immediately contact the valve operator and/or the valve manufacturer to report the error. Thereby it may be avoided that a data record of the valve containing incorrect information about the valve is established.

According to an advantageous embodiment of the invention, the marking is decoded by the mobile communication device to establish said identity.

One advantage of the above embodiment may be that the size of the data package may be reduced. By establishing the identity in the mobile communication device it may not be necessary to include e.g. a photograph of the marking in the data package.

According to an advantageous embodiment of the invention, the marking is decoded by the central server to establish said identity.

One advantage of the above embodiment may be that the data processing in the mobile communication device may be reduced. By including a representation, such as a photograph, of the marking in the data package, it decoding of the marking and establishing of the identity may be performed by the central server.

According to an advantageous embodiment of the invention, the mobile communication device and/or the central server decodes said marking to establish said identity using an error-correction algorithm, such as a Reed-Solomon error correction code, a low-density parity-check (LDPC) code, or a turbo code.

According to an advantageous embodiment of the invention, the data package is validated at the central server.

According to example embodiments, the valve location may be validated at the central server by comparing metadata from the digital photograph with other information, such as information received by the central server in the data package.

According to one example, the metadata of the digital photograph may comprise time data, such as a time stamp, which may compared to time data of the data package or a time of receiving the data package. If the time from the metadata and the other time matches or the difference is below a predefined threshold, the data package may be approved.

According to another example, the metadata of the digital photograph may comprise location data, such as coordinates established similar to the valve location. The location data from the metadata may then be compared to the valve location, and the approval of the data package may depend on a match of the metadata location and the valve location, at least within a certain threshold.

According to an advantageous embodiment of the invention, the valve location is validated at the central server.

According to an advantageous embodiment of the invention, the identity comprises at least a type identification, and wherein the type identification is validated against the digital photograph.

Validation against the digital photograph may comprise establishing at least partly a type identification from the digital photograph, e.g. by image recognition software, or by identifying a dominant color of the valve from the digital photograph, and comparing the at least partly established type identification from the digital photograph with the type identification established from the marking.

According to an advantageous embodiment of the invention, the central server in response to receiving said data package transmits an acknowledgement of receipt to the mobile communication device.

An advantageous and important feature of the embodiment is that the central server may automatically confirm to the mobile communication device, that the received at least one data package has been properly received.

According to an advantageous embodiment of the invention, the central server in response to receiving said at least one data package performs an automatic validation of the received at least one data package and transmits an acknowledgement of receipt to the mobile communication device if the at least one received data package is valid or transmits an alert to the mobile communication device is the received at least one package is invalid.

The automatic validation may be performed in several different ways and may offer several significant benefits to engineer or the operator. Automatic validation of the received at least one data package at the central server end may e.g. involve a check that the registered valve location is in compliancy with an expected valve location registered at the central server. In this way, wrongly located valves may be avoided.

Another automatic validation may refer to the reading of the marking itself and the engineer may be immediately be alerted if a marking has been misread or cannot be read and thereby rendering the valve record to be established void or of little use.

An automatic validation may also refer to an automatic extraction of valve features by image recognition, which may be mapped into some or all the fields of a valve record to be established. In other word, the valve may be automatically categorized if the marking is either unreadable or if the valve is not supplied with a marking.

According to an advantageous embodiment of the invention, the central server in response to receiving said data package transmits an acknowledgement of receipt to the operator.

According to an advantageous embodiment of the invention, said acknowledgement of receipt comprises a representation of the received digital photograph.

The transmitted digital photograph may serve as a check for the records, that the operator can use later to establish that the valve is mounted in conformity with guidelines or regulation and the user of the mobile device may verify that the digital photograph is of a sufficient quality to show the relevant details of the mounting.

According to an advantageous embodiment of the invention, the valve location is converted to an address or location and transmitted to the user and/or the operator for a verification of the registered valve location.

When converting valve location into an address location, e.g. the nearest address, it is possible for the engineer or the valve operator to observe a possible malfunctioning of the navigation satellite signal receiver or lack of sufficient signal to determine a correct valve location and thereby avoid one or several wrongly located valves.

Also, according to a further embodiment, the user of the mobile communication device may, after a valve location has been established by means of the mobile communication device, correct the valve location. The correction of the valve location may be done in various ways.

One way of correcting the valve location involves drag and drop correction of the valve location on a visual representation of the valve location to be corrected, the drag and drop correction being carried out via the mobile communication device, preferably on a touch screen of the mobile communication device, The visual representation of the valve location may preferably be a representation on a map and/or satellite images.

Another way of correcting the valve location involves typing in an address being the best representation of the actual valve location.

Another way of correcting the valve location involves typing location coordinates being the best representation of the actual valve location.

Another way of correcting the valve location involves typing in a comment being the best representation of the actual valve location. The comment may include one or more addresses, location coordinates, or further details, such as details on how the actual valve location relates to the address(es).

According to an advantageous embodiment of the invention, the valve engineer verifies the type of valve via the mobile communication device.

For example, the reading of the marking reveals information in the marking about the type of valve. The valve engineer may then approve the type of valve, if he agrees, or, if he disagrees, report the error and/or correct the type of valve.

According to an advantageous embodiment of the invention, the valves are colored according to a technical classification and the valve engineer verifies the color.

The valve engineer may for example perform the verification of the color from information from the marking and/or information received by the mobile communication device based on the established identity of the valve. If the valve engineer disapproves with the color information in from the marking, he may correct this and/or report the error.

According to an advantageous embodiment of the invention, the valve engineer verifies the valve location established by means of the navigation satellite signal receiver.

If the valve engineer disapproves the valve location established by means of the navigation satellite signal receiver, he may correct the valve location and/or report the error. The correction may be done by moving a marker in a graphical representation of the location and/or by inputting search criteria, such as an address, to establish the location.

According to an advantageous embodiment of the invention, an operator may input a new record manually by transmitting a combination of valve identification parameters and/or valve features.

It may advantageously be possible to add valve entries to the central database by facilitating a manually operated entry of valves without a marking into the system. The valves may be described with a number of mandatory fields. The fields should be comparable to the automatically established fields, thereby allowing searching in the combined database.

These valve features are already present in the system for the valves marked with a marking, typically by the valve manufacturer.

According to an advantageous embodiment of the invention, at the central server, extracting at least one feature from the received photograph, the at least one feature corresponding at least one field of the valve record.

According to an advantageous embodiment of the invention, inserting said at least one feature or a derivative thereof automatically as a field of the valve record According to an advantageous embodiment of the invention, transmitting the at least one extracted feature or a derivative thereof to the installer for approval.

According to an advantageous embodiment of the invention, the marking comprises graphical tag attached to the valve.

A graphical tag typically comprises an image, which can be read optically by a mobile telephone camera. Typical graphical tags include linear or one-dimensional codes, e.g. barcodes, and two-dimensional codes, such as matrix codes, Examples of matrix codes include QR codes (Quick response codes), Datamatrix, Semacode, barcodes, Shot-Codes, Cool-Data-Matrix, Aztec, UPCODE, Trillcode, Quickmark, mCode, Beetagg, High Capacity Color Barcode, etc.

One advantage of using a graphical tag may be any mobile device comprising a camera may read the tag. Also, communication protocols may be updated, both via updated software and/or hardware, and such updates may not necessarily be completely backwards compatible. Furthermore, while NFC tag readers are available in increasing number mobile phones, such development may not necessarily continue, and may not necessarily be equivalent for different mobile phone brands and/or for different mobile phone operative systems. However, by using graphical tags, such technical differences, inconsistencies or problems may be circumvented since any camera may read any tag.

According to an advantageous embodiment of the invention, graphical tag comprises a two-dimensional graphical tag attached to the valve.

According to an advantageous embodiment of the invention, the two-dimensional graphical tag comprises a QR code attached to the valve.

According to an advantageous embodiment of the invention, the marking comprises a passive electro-magnetically readable tag attached to the valve.

In this context a passive tag is meant as a tag without any internal power supply or wired power supply. Typically such passive electro-magnetically readable tags may be powered externally by means of wireless power, preferably from the mobile communication device.

Wireless power may e.g. be facilitated by means of electromagnetic induction from magnetic fields produced by the power source, preferably the mobile communication device.

Wireless power may e.g. be facilitated by harvesting energy from radio waves from radio waves from the power source, preferably the mobile communication device, i.e. the marking acts as a passive transponder.

In some alternative embodiments the marking may be an electro-magnetically readable tag attached to the valve, the electro-magnetically readable tag having an internal power source, such as a battery, and/or the electro-magnetically readable tag being electrically connected to a power source, such as a battery, in or associated with said valve.

According to an advantageous embodiment of the invention, the marking comprises an RFID tag attached to the valve.

According to an advantageous embodiment of the invention, the marking comprises a Near Field Communication (NFC) tag attached to the valve.

According to an advantageous embodiment of the invention, the mobile communication device is a single unit comprising said camera and said navigation satellite signal receiver, the mobile communication device comprising programming for carrying out the steps performed by said mobile communication device under control of the user interface of the mobile communication device.

The applied user interface may typically comprise a graphical user interface (GUI) and/or keys and/or a keyboard. The user interface allows the user to input the relevant commands to the communication device upon which the mobile communication devices executes the initiated processes automatically.

According to an advantageous embodiment of the invention, the valve is a fluid valve.

According to an advantageous embodiment of the invention, the valve is a chosen from the group consisting of a gas valve, a drinking water valve, and a waste-water valve.

According to an advantageous embodiment of the invention, the valve record comprises a number of fields.

According to an advantageous embodiment of the invention, at least one of the fields of the valve record comprises at valve location field.

According to an advantageous embodiment of the invention, the valve record comprises a classification field.

A classification field may advantageously be applied by the operator to establish an easy searchable database allowing the operator to dedicate different priorities. Such a priority may e.g. include importance, type of valves, intended service level etc. The service level may e.g. include a searchable marking or the valve allowing the operator to e.g. search for valves requiring service within a given interval. The classification field may be established based on further information in the data package, or may be added based on e.g. a location.

According to an advantageous embodiment of the invention, the valve record comprises one or more further fields.

The valve record may comprise one or more further fields, which may be based on information from the valve engineer via the mobile communication device and/or from the valve operator. The one or more further fields may comprise information about the size of the pipings and/or the valve, the position of the valve, such as subterranean or not, installation depths, such as depth relative to ground level, installation date, contractor and/or installer name or ID, further photographs, such as photographs of galvanic protection, actuation, etc.

The valve record may also comprise one or more further fields comprising information about certificates, official approvals, historical even data, maintenance data, such as maintenance interval, time of next maintenance, time of last maintenance, accessibility, means of access, such as tools needed to access the valve, details about the connected piping, such as working pressure, piping material, materials transported by the piping, or supply data, e.g. addresses or facilities which may be affected when closing the valve.

Also, the one or more further fields may comprise activation data, and/or an operation specification of the valve. In particular, information about how to activate the valves may be advantageous. Different valves may be activated, i.e. switched from an open to a closed configuration or vice versa, either manually or by means of an actuator. Such activators may be e.g. pneumatically or hydraulically driven.

Also, the one or more further fields may comprise information about corrosion protection of the valve, such as e.g. corrosion protection wrapping.

Also, the one or more further fields may comprise information about product anchorage, e.g. if the valve is used as a fix point to fixate the pipeline.

Also, the one or more further fields may comprise information about network complexity, relation to neighboring installations and/or products. It may in some cases be necessary to respect certain circumstances related to network complexity or to relations to neighboring installations or products, e.g. when performing emergency procedures or shutdowns, e.g. due to contamination.

According to an advantageous embodiment of the invention, the one or more further fields comprises information about the working pressure of the valve.

According to an advantageous embodiment of the invention, at least one of the further fields comprises a valve type.

According to an advantageous embodiment of the invention, at least one of the further fields comprises a user defined priority (UDP).

According to an advantageous embodiment of the invention, at least one of the further fields comprises a user defined category (UDC).

According to an advantageous embodiment of the invention, at least one of the further fields comprises a mounting date.

According to an advantageous embodiment of the invention, the database is located with the central server.

In some embodiments, the database is integrated in the central server or otherwise located with the central server. Depending on the setup, the central server and the database may be at the valve operator or at the application service provider.

According to an advantageous embodiment of the invention, the database is external from the central server.

In some embodiments the database may be e.g. located at the operator, whereas the central server may be at the application service provider. However, the database and the central server may also be at different locations of the valve operator, or at different locations of the application service provider. Moreover, the database may be distributed to two or more separate locations. One such database may evidently be a backup database, but the database may also advantageously be distributed between different operators.

According to an advantageous embodiment of the invention, the valve records of the database are stored as records in a relational database.

A preferred database structure is the relational database structure. A relational database is a database that stores information about both the data and how it is related. Data and relationships are represented in a flat, two-dimensional table that preserves relational structuring.

A Relational Database Management System is the physical and logical implementation of a relational database (hardware and software). A Relational Database Management System controls reading, writing, modifying, and processing the information stored in the databases. The data is formally described and organized according to each database's relational model according to the design.

Relational databases tend to be either significantly normalized or de-normalized. Normalized databases tend to have better data integrity, reduced storage space, and faster transmissions. Databases are de-normalized to improve performance, often for reporting and decision-making applications. De-normalized databases may form data marts and warehouses. Most data warehouses have an operational database that is used to produce the data marts.

A database applicable within the scope of the invention includes MySQL, PostgreSQL, Microsoft SQL Server, Oracle, SAP and IBM DB2.

According to an advantageous embodiment of the invention, the valve records of the database are stored according to a hierarchical database model.

According to an advantageous embodiment of the invention, the valve records at the database are stored according to a network model.

According to an advantageous embodiment of the invention, the valve records at the central server are stored according to a hierarchical database model or and the network model.

According to an advantageous embodiment of the invention, a preliminary workflow list is stored on the mobile communication device, the list comprising at least one referral to valves to be installed or maintained, the referral to the valves including valve locations.

According to an advantageous embodiment of the invention, the application software stored on the mobile communication device is visualized to the user on the graphical user interface (GUI) on the mobile device and enables the user to choose one of the referrals on the preliminary workflow list for displaying of the information related to the referral.

According to an advantageous embodiment of the invention, the application software stored on the mobile communication device further enables the user to activate the referral by means of the interface of the mobile communication device for activation of said transmitting at least one data package to a central server, and wherein the data contained in said at least one data packages is at least partly obtained from said chosen referral.

The user, e.g. the engineer, may therefore easily establish the necessary data for the intended transmission of data related to the valve record and the user may therefore avoid typing or inputting too many data and partly base the transmission on the data contained in the chosen referral of the preliminary workflow list. This is a very strong feature of the system, as "office work" at the installation site is not necessary very easy.

Another great feature is that the engineer may plan his installing or maintenance from home or he may receive the list from the operators, thereby keeping the operator or the contractor in the loop with respect to progress of maintenance or installing of the valves.

According to an advantageous embodiment of the invention, the one or more data packages and/or the valve record established at least partly on the basis of the one or more data packages comprises information about corrosion protection of the valve.

According to an advantageous embodiment of the invention, the one or more data packages and/or the valve record established at least partly on the basis of the one or more data packages comprises information about comments by the valve engineer, if any.

According to an advantageous embodiment of the invention, the one or more data packages and/or the valve record established at least partly on the basis of the one or more data packages comprises information about the customer valve reference.

According to an advantageous embodiment of the invention, the size of the digital photograph is between 100 kilobytes and 10 megabytes.

According to an advantageous embodiment of the invention, the digital photograph of the valve is transmitted to the central server as a compressed image obtained through a lossy or a lossless compression.

According to an advantageous embodiment of the invention, a compression may avail an improved transfer of the digital photograph of the valve to the central server.

According to an advantageous embodiment of the invention, the digital photograph of the valve is transmitted to the central server as a compressed image obtained through a lossy compression, thereby benefiting from the fact that the compressed image may sufficiently show all the necessary details of the valve without requiring too much bandwidth.

Moreover, even a compressed image may be applied for an automatic image detection application applied for determining the valve type or the valve make automatically.

According to an advantageous embodiment of the invention, the mobile communication device may communicate with said central server via a mobile cellular network According to an advantageous embodiment of the invention, the mobile communication device may communicate with said central server via a mobile cellular network.

According to an advantageous embodiment of the invention, the mobile communication device may communicate with central server via a WIFI-connection to a communication network.

According to an advantageous embodiment of the invention, the mobile communication device may communicate with central server via the Internet.

The communication between the central server and the mobile communication device may be performed in different ways. Preferably, the communication device should be connectable as flexible as possible to the central server, thereby leaving different option open.

According to a preferred embodiment of the invention, the communication between the central server and the device is established as a mobile telecommunication between the device and a signal receiver, which again will facilitate communication of data via Internet connection to the central server and vice versa. The mobile telecommunication between the mobile and the device may e.g. be channeled through a 3G, 4G or a 5G system. Another connection, such as a WIFI connection from the mobile device to a wireless access point and from there to a central server via e.g. the Internet may also be applied, although such system is presently relatively restricted to the restricted coverage by existing wireless access point when compared to obtainable coverage by means of base stations of mobile telecommunications technology.

According to an advantageous embodiment of the invention, said valve record comprise a unique identity.

The unique identity of the valve record may correspond or be identical to a unique identity of a marking and/or a valve.

By said valve record having a unique identity it may be ensured that more than one valve record may be made for a particular valve type or model, or, if the markings are non-unique, that more than one valve record may be made for valves coincidentally having the same marking.

The unique identity of the valve record may be established when establishing the valve records, and may e.g. be a consecutive numbers for each new valve record.

According to an advantageous embodiment of the invention, the communication between the mobile communication device and the central service is encrypted.

According to an advantageous embodiment of the invention, the communication between the central service and the database is encrypted.

According to an advantageous embodiment of the invention, the valve records stored in the database is encrypted.

In connection with the above, it may be advantageous that transmission and storage of data of the method is encrypted.

The invention relates in a second aspect to a valve locator comprising a search engine and a valve database established according to the first aspect or any embodiment thereof,
the valve database comprising a plurality valve records,
the search engine being established for searching in said valve database,
the search engine comprising a number of search input fields,
the search input fields being associated to fields of said valve records,
at least one of the search input fields comprising valve location.

A search engine in the present context is a software system that is designed to search for information, typically the related valve database. In particular, the present search engine is a part of a valve locator, i.e. software running on a hardware platform, central or distributed. A very important and advantageous feature of the invention is that specific valve records may be searched and found upon user of search criteria other than its unique identity. Applicable search fields may e.g. include a valve type, a valve location, a user defined priority, a user defined category, time of installation, a digital photograph of the installed valve, etc. The valve records may be searched and extracted from the database for various purposes such as more emergency related events, e.g. a leakage in a known area, but also for more routine based planning of maintenance.

Applicable search fields may include e.g. the size of the pipings and/or the valve, the position of the valve, such as subterranean or not, installation depths, such as depth relative to ground level, installation date, contractor and/or installer name or ID, further photographs, such as photographs of galvanic protection, actuation, etc.

Applicable search fields may include e.g. information about certificates, official approvals, historical even data, maintenance data, such as maintenance interval, time of next maintenance, time of last maintenance, accessibility, means of access, such as tools needed to access the valve, details about the connected piping, such as working pressure, piping material, materials transported by the piping, or supply data, e.g. addresses or facilities which may be affected when closing the valve.

Applicable search fields may include e.g. activation data, and/or an operation specification of the valve. In particular, information about how to activate the valves may be advantageous. Different valves may be activated, i.e. switched from an open to a closed configuration or vice versa, either manually or by means of an actuator. Such activators may be e.g. pneumatically or hydraulically driven.

Applicable search fields may include e.g. information about corrosion protection of the valve, such as e.g. corrosion protection wrapping.

Applicable search fields may include e.g. information about product anchorage, e.g. if the valve is used as a fix point to fixate the pipeline.

Applicable search fields may include e.g. information about network complexity, relation to neighboring installations and/or products. It may in some cases be necessary to respect certain circumstances related to network complexity or to relations to neighboring installations or products, e.g. when performing emergency procedures or shutdowns, e.g. due to contamination.

The valve locator may be applied to enable a fast shutdown of relevant valves e.g. when utilized to prevent spreading of *E. coli* or other contaminants.

According to an advantageous embodiment of the invention, the at least one of the input fields relates to information registerable.

According to an advantageous embodiment of the invention, at least one of the input fields comprising valve type.

According to an advantageous embodiment of the invention, at least one of the input fields comprising a user defined priority (UDP).

According to an advantageous embodiment of the invention, at least one of the input fields comprising a user defined category (UDC).

According to an advantageous embodiment of the invention, at least one of the inputs field comprising a mounting date or a mounting interval.

According to an advantageous embodiment of the invention, the search engine communicated with a search user interface comprising the searchable input fields.

The invention relates in a third aspect to a mobile communication device comprising programming for carrying out the steps of the method according to the first aspect of the invention or any embodiment thereof performed by the mobile communication device.

The intention relates in a fourth aspect to mapping of a plurality of valves registered according to the first aspect of the invention or any embodiment thereof, the method comprising the step of on mapping the valve records or representations of the valve records on a geographical interactive map, the graphical interactive map (GIM) including a valve filter (VF), by means of which a user of the interface may establish a filter based on at least one parameter referring to the fields of the valve records of the database.

The mapping may e.g. be shown at geographical map on a display of a mobile device or another data processing device and the mapping may help the user to easily visually locate valves or groups of valves. Moreover, the user may have the option of applying a filter on the valves to see only a desired subset of valves.

According to an advantageous embodiment of the invention, at least one of the parameters comprising valve type.

According to an advantageous embodiment of the invention, at least one of the parameters comprising a user defined priority (UDP).

The invention relates in a fifth aspect to a system comprising a number of hardware components, the system executing the method according to the first aspect of the invention or any embodiment thereof.

According to an advantageous embodiment of the invention, the system comprising a mobile device and a central server.

According to an advantageous embodiment of the invention, the method on the central server side is performed automatically according to predefined installed software routines.

According to an advantageous embodiment of the invention, the method further comprises an operator server (OS).

According to an advantageous embodiment of the invention, the operator server executes and hosts the mapping of the valves according to the forth aspect of the invention or any embodiment thereof.

According to an advantageous embodiment of the invention, the central server executes and hosts the mapping of the valves according to the forth aspect of the invention or any embodiment thereof.

FIGURES

Figure 2:
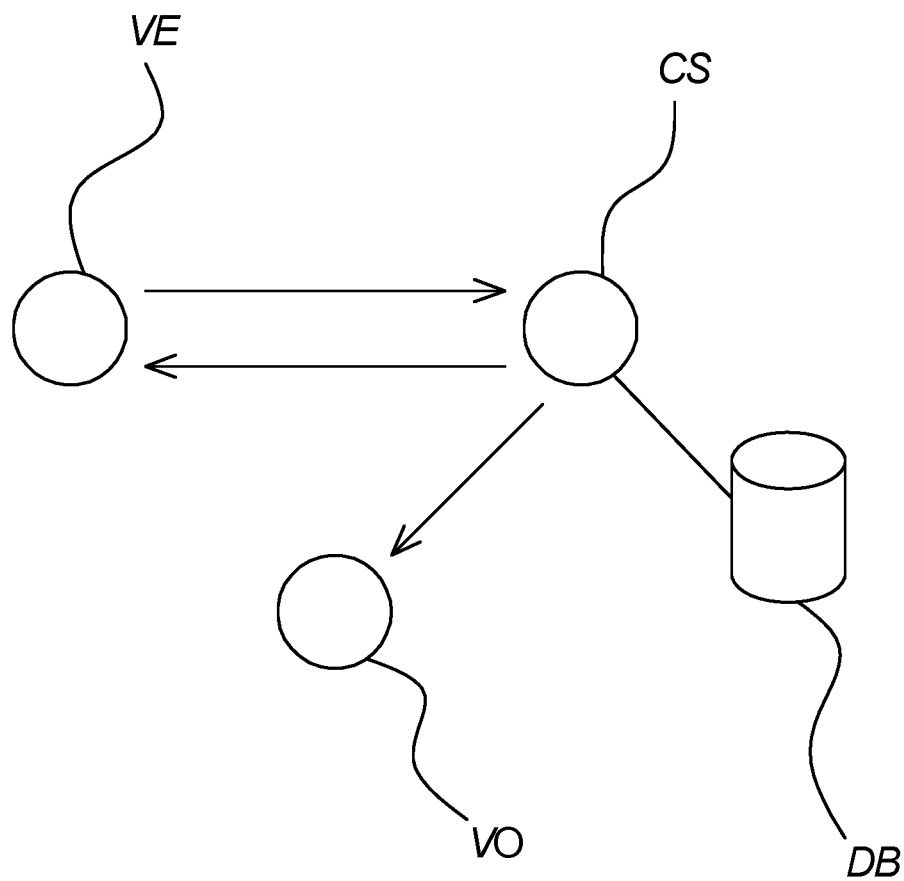
Figure 3:
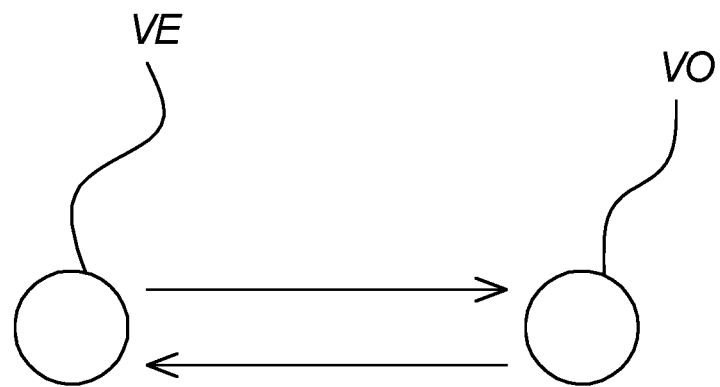
Figure 4:
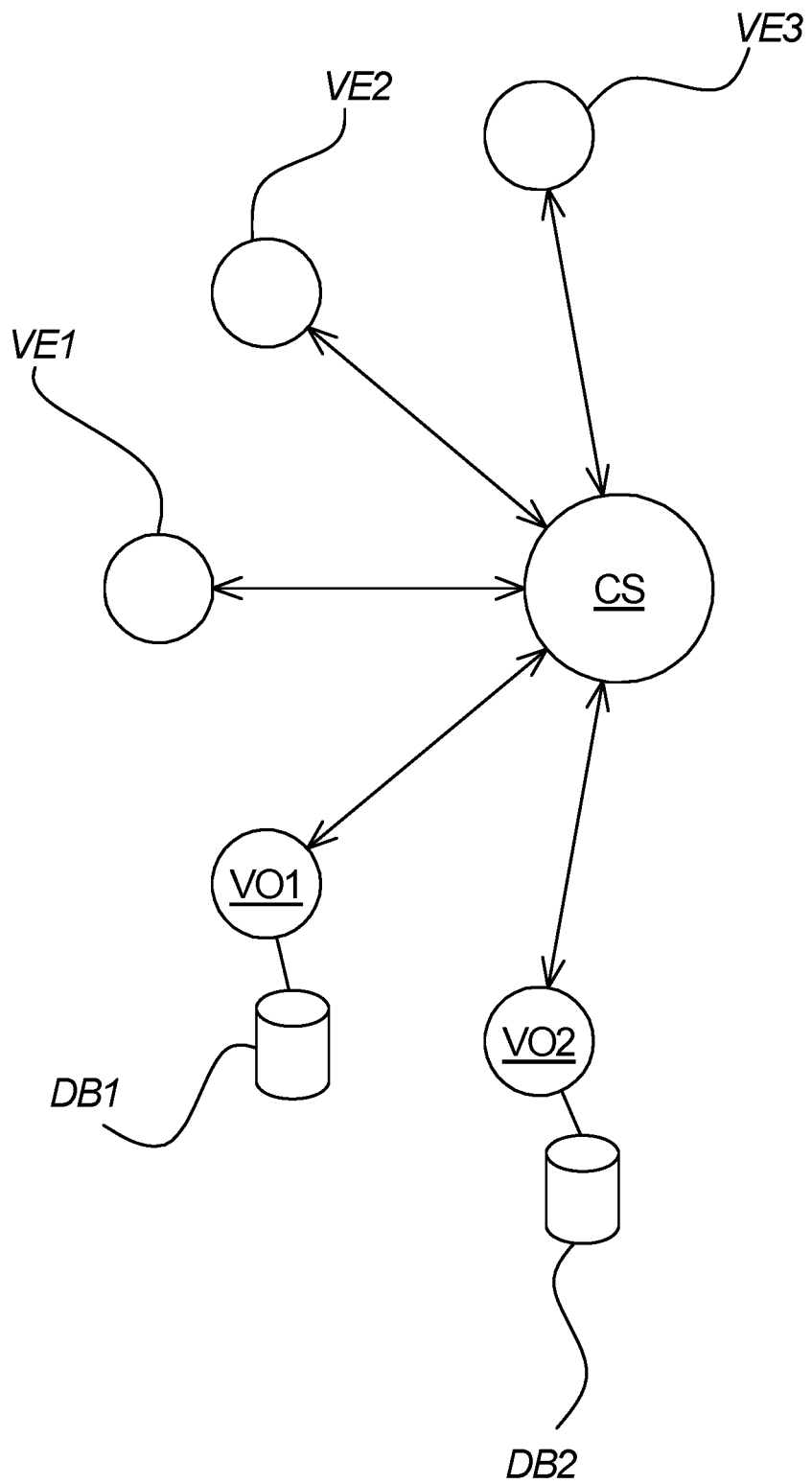
Figure 5:
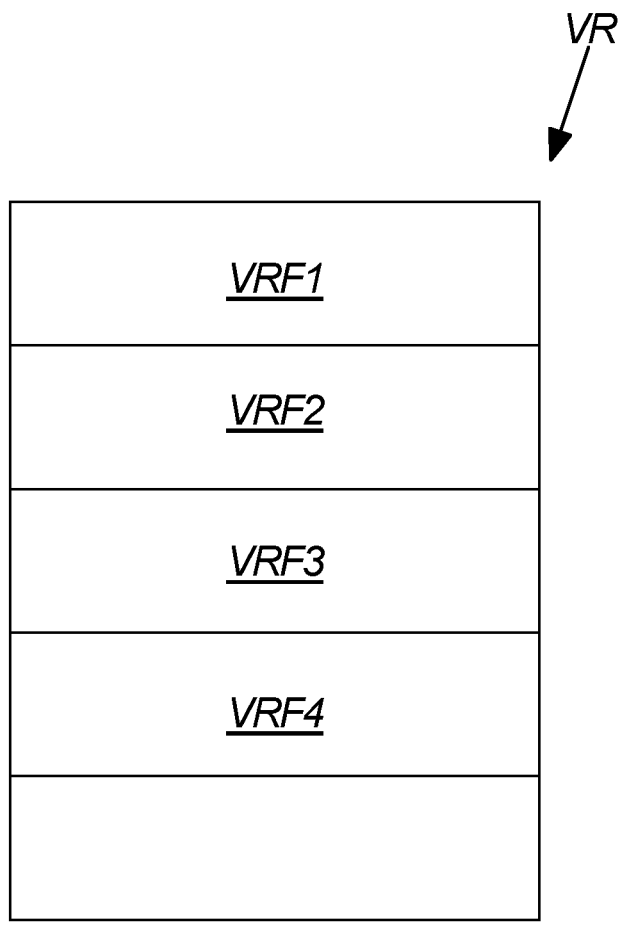
Figure 6:
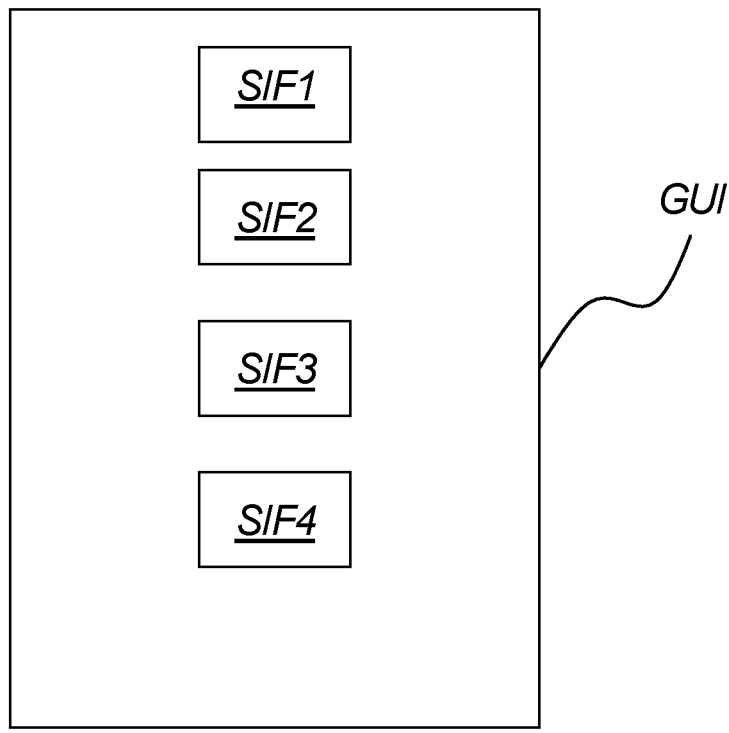
Figure 7:
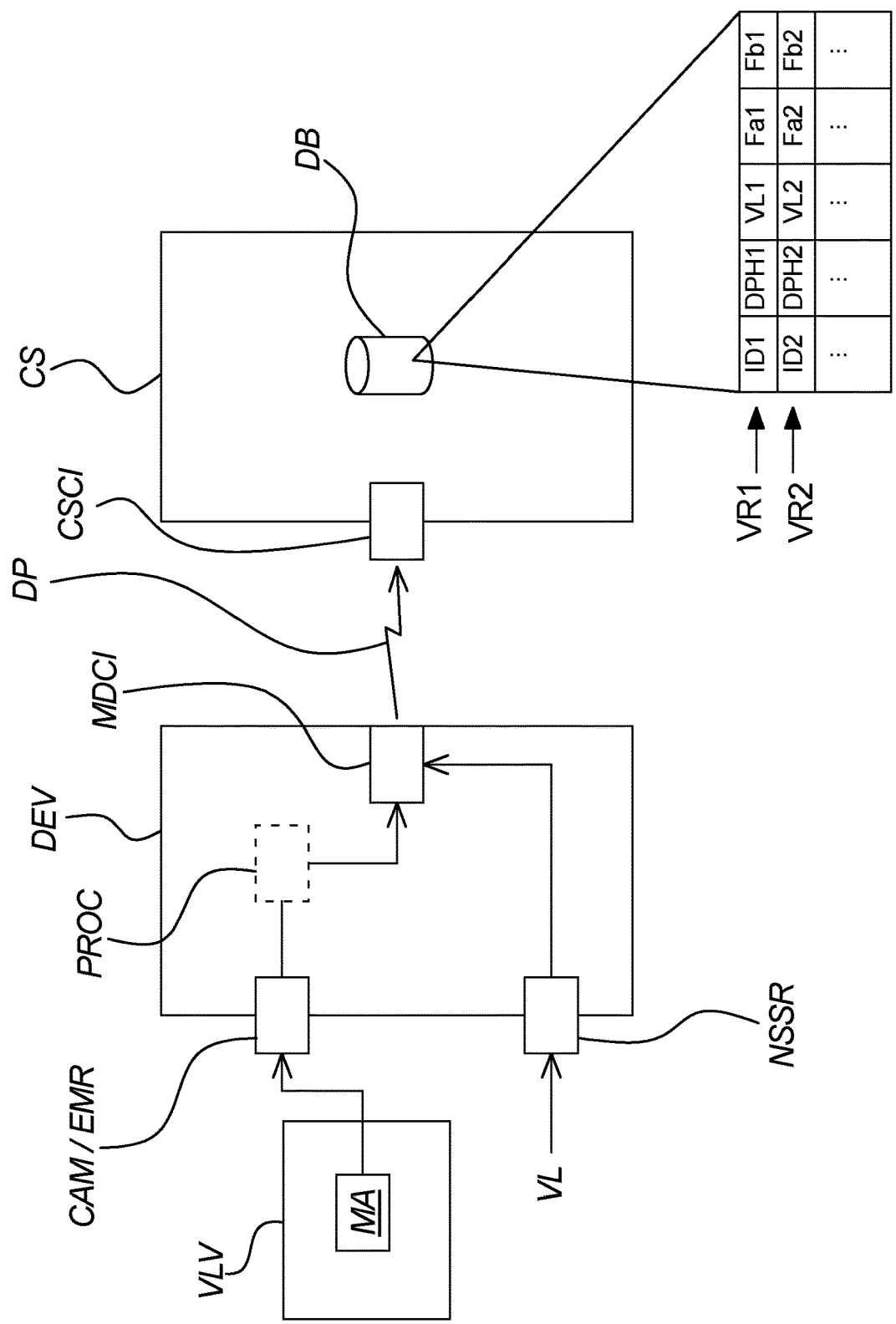
Figure 8:
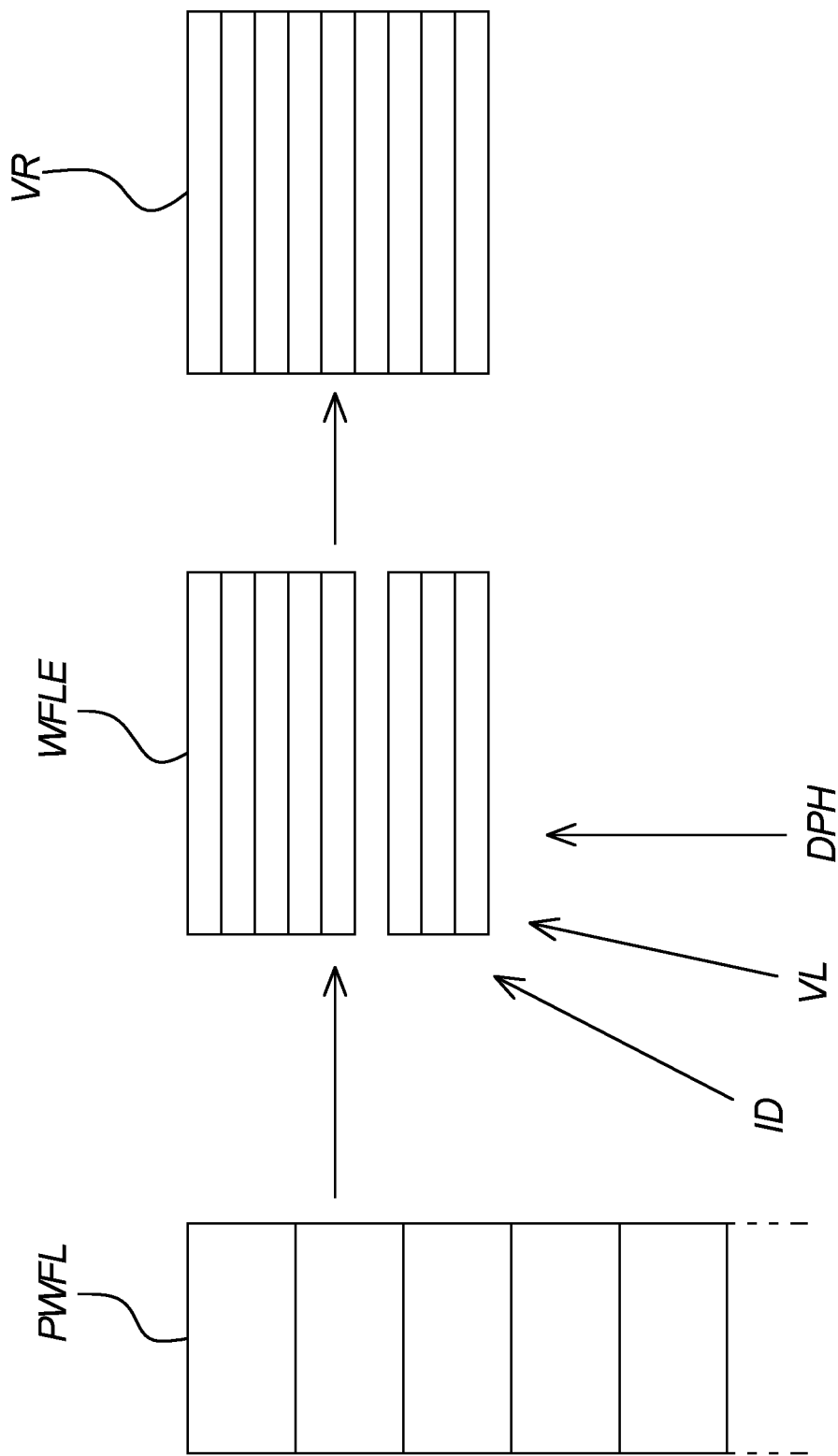
Figure 9:
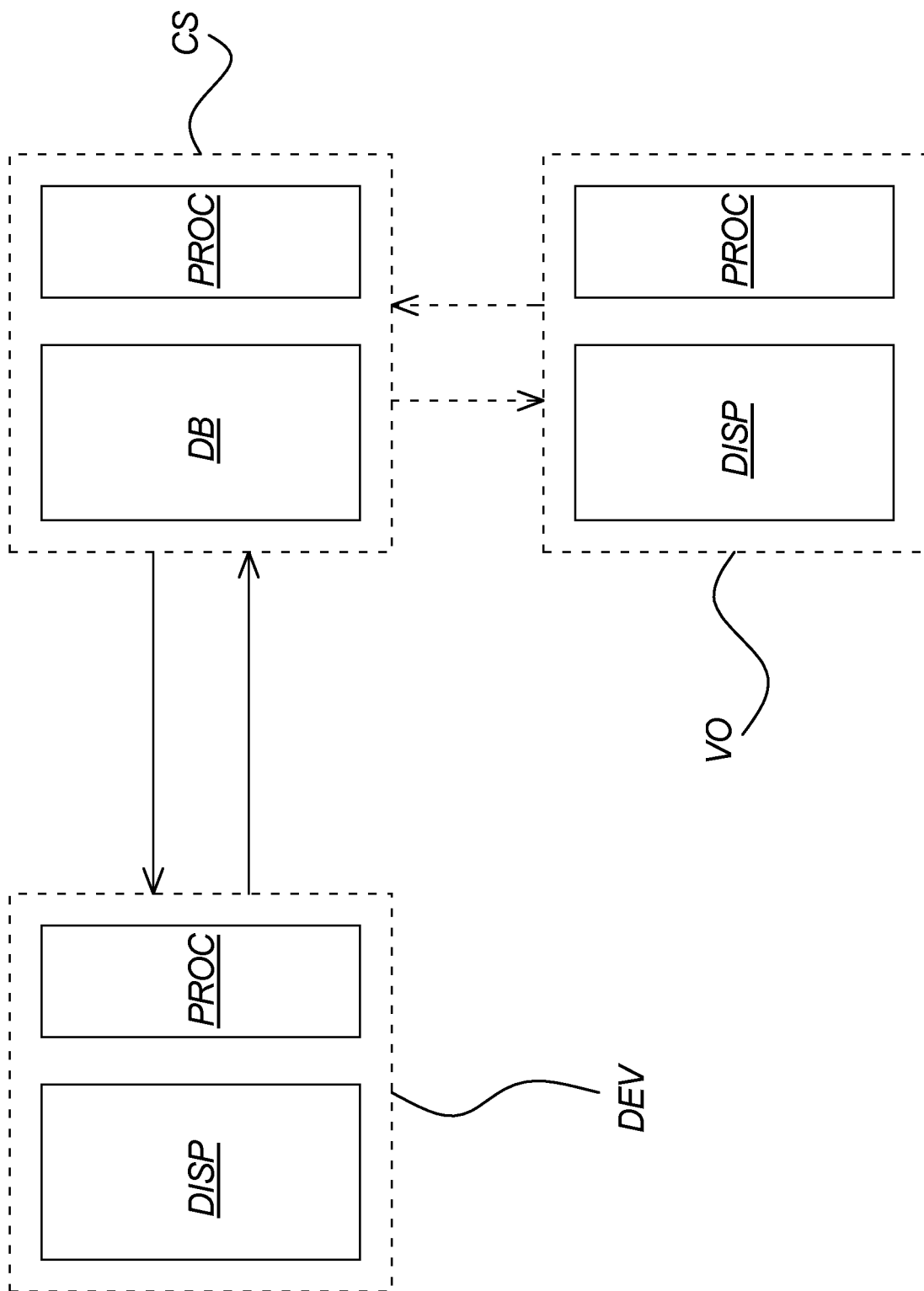

The invention will be described in the following with reference to the figures in which FIG. 1 illustrates the steps of a method of registering an installed valve according to an embodiment of the invention, FIG. 2 illustrates an embodiment of the invention with a central server between the valve operator and the valve engineer, FIG. 3 illustrates an embodiment of the invention with direct communication between the valve operator and the valve engineer, FIG. 4 illustrates an embodiment of the invention with more than one valve engineer and more than one valve operator, FIG. 5 illustrates a valve record according to an embodiment of the invention, FIG. 6 illustrates a graphical user interface of a valve locator according to an embodiment of the invention, FIG. 7 illustrates the operation according to an embodiment of the invention, FIG. 8 illustrates an embodiment of the invention including a preliminary workflow list, and FIG. 9 illustrates a hardware system according to an embodiment of the invention for carrying out an embodiment of the invention.

DETAILED DESCRIPTION

On FIG. 1 a method of registering an installed valve VLV (not shown) according to an embodiment of the invention is illustrated. The installed valve VLV has a marking MA (not shown) associated to an identity ID (not shown).

The method of FIG. 1 may be carried out by a hardware system, comprising a mobile communication device and a central server. FIG. 1 shows only the steps of the method, not the hardware system; however, a hardware system for carrying out the method of FIG. 1 is illustrated on FIG. 7. Also, some aspects of a hardware system for carrying out the method of FIG. 1 is illustrated on FIG. 9.

The method of FIG. 1 comprises a number of steps. Starting from S1, a mobile communication device DEV is provided in step S2. The mobile communication device DEV comprises a navigation satellite signal receiver NSSR.

Then, a registration of the valve VLV is established by performing the following steps with the mobile communication device DEV:

a) reading, in step S3, the marking MA attached to the valve VLV, b) establishing, in step S5, a valve location VL by means of the navigation satellite signal receiver NSSR, and c) transmitting, in step S6, at least one data package DP to a central server CS, said at least one data package DP comprising a representation of the marking MA or the associated identity ID and the established valve location VL.

Then, in step S7, said at least one data package DP is received at the central server CS.

Then, in step S8, a valve record VR is established at the central server CS. The valve record VR associates the identity ID to the established valve location VL.

Finally, in step S9, the valve record VR is stored in a database DB. In FIG. 1, step S9 is illustrated as taking place in the central server, however, the database DB may in some embodiments be located external from the central server CS.

In should be noted in connection with the above embodiments that the order of steps S3 and S5, and optional step S4, if present, may be changed.

As illustrated in FIG. 1, some of the steps, i.e. steps S2-S6, are associated with in the mobile communication device DEV, whereas steps S7-S8 and possibly step S9 as associated with the central server CS.

Furthermore, in FIG. 1 an optional step S4 is illustrated. In step S4, a digital photograph DPH of the installed valve VLV is established by means of a camera CAM. The camera CAM is, at least in such embodiments, a part of the mobile communication device, i.e. the mobile communication device DEV comprises a camera CAM.

It is noted that in some embodiments where graphical markings are used, steps S3 and S4 may be the same, establishing a digital photograph which includes a representation of the marking, the representation having a sufficient quality to allow subsequent decoding of the marking to obtain the identity associated with that marking.

As well understood, the present invention has a huge impact and several special benefits in connection with valves, due to the fact that valves have special properties. The invention may however also be applied for registration of appurtenance, i.e. a component other than valve that is attached to the pipeline; e.g. tee, casing, fittings, instrument connection, etc.

Referring to FIG. 2 an embodiment of the invention is illustrated, which may be understood in connection with the embodiment of FIG. 1.

In FIG. 2, a valve engineer VE, a central server CS, and a valve operator VO are shown.

The central server CS may be located at an application service provider ASP (not shown).

The valve operator VO is in this embodiment located separately from the central server CS.

The valve engineer VE communicates with the central server CS, by means of a mobile communication device DEV (not shown).

Preferably, as illustrated, the communication is two-way communication. However, in some embodiments, the communication may be one-way, i.e. from the valve engineer VE to the central server CS.

The valve engineer VA transmits, via the mobile communication device (not shown), information elements to the central server CS. The information elements are transmitted as one or more data packages, and comprise at least a valve location VL, and a marking and/or an identity associated with the marking.

Preferably, as illustrated, a database DB is associated with the central server CS, e.g. as a part of the central server CS.

The central server CS transmits the received information elements, preferably as a valve record VR to the valve operator VO. Transmission may preferably be done over the internet.

The central server CS may in some embodiments e.g. be located at a valve manufacturer, or at an application service provider associated with a valve manufacturer, The database DB may in some embodiments receive data from a valve manufacturer, or at an application service provider associated with a valve manufacturer.

Now, on FIG. 3 a further embodiment is illustrated, which may be understood in connection with the embodiment of FIG. 1. In FIG. 3, a valve engineer VE and a valve operator VO are illustrated.

Contrary to the embodiment illustrated in FIG. 2, the valve engineer VE in the present embodiment of FIG. 3 is in direct communication with the valve operator VO. The valve operator VO according to this embodiment provides a central server CS for receiving data packages transmitted by the valve engineer VE.

Referring now to FIG. 4, a further embodiment of the invention is illustrated, which may be understood in connection with the embodiment of FIG. 1. On FIG. 4, a first, second, and third valve engineer VE1, VE2, VE3 are shown. A central server CS is shown. A first and second valve operator VO1, VO2 are shown. A first and a second database DB1, DB2 are shown.

The valve engineers VE1, VE2, VE3 each communicates with the central server CS similar to the valve engineer on FIG. 2. Preferably, as illustrated the communication is two-way communication. Alternatively, the valve engineers VE1, VE2, VE3 are at least able to transmit data to the central server CS.

The central server CS communicates with each the valve operators VO1, VO2 in a similar way as the central server CS and the operator VO communicates in FIG. 2.

Each of the first and second databases DB1, DB2 is associated with a first and second valve operator VO1, VO2, respectively. For example, each database DB1, DB2 may be located with the corresponding valve operator VO1, VO2, as illustrated. As the valve operator VO1, VO2 may typically be a company or a public or semipublic entity, the database DB1, DB2 may e.g. be located within the buildings or facilities of the valve operator VO1, VO2. In some embodiments, one or more databases DB1, DB2 may be externally hosted, e.g. based on cloud computing, i.e. located at a decentralized server, preferably only accessible by the relevant valve operator VO1, VO2.

In an example embodiment, the first and second valve engineers VE1, VE2 may be associated with only the first valve operator VO1, whereas the third valve engineer VE3 may be associated with only the second valve operator VO2. Typically, when each of the valve engineers VE1, VE2, VE3 communicates with the central server CS using their respective mobile communication devices (not shown), they may, e.g. when initializing the software on the mobile communication device adapted for facilitating the registration of the data to be communicated to the central server, enter a username and/or password. One or more of the username, the password, or a further identification field based, at least partly, on the username and/or password may then be included in the one or more data packages communicated from each valve engineer VE1, VE2, VE3 to the central server CS. Thereby, the central server CS may determine to which of the valve operators VO1, VO2 the particular one or more data packages received from a certain valve engineer VE1, VE2, VE3 is to be transmitted.

In some embodiments, one or more of the valve engineers VE may be associated with two or more of the valve operators VO. In such embodiments, such valve engineers may preferably have a separate username and/or password associated with each of the relevant valve operators, or the software on his/her mobile communication device may allow choosing the valve operator.

In many typical embodiments, multiple valve engineers VE and/or multiple valve operators may be associated with the same central server CS.

In some embodiments, multiple central servers CS may be used. Some or all of the central servers CS may be adapted to operate in collaboration or in parallel.

FIG. 5 illustrates the principle of a valve record VR applied according to an embodiment of the invention.

The valve record VR represents a data item of a database (not shown) applied in the system e.g. as illustrated in FIG. 2 to FIG. 4 and applied according to provisions of the invention.

The valve record VR may be stored in a central database e.g. as illustrated in FIG. 2 or it may also be stored in de-central databases as illustrated in FIG. 4.

The valve record comprises a number of fields VRF1-VRF4. The fields are typically established centrally at the receiving end of the transmitted data packages from a mobile device, e.g. according to the transmission flow illustrated and explained with reference to FIG. 1.

The field may e.g. include a number field, a valve location field, a classification field, a valve type, a user defined priority, a user defined category or e.g. a mounting date. All fields relates to the registered valve in question.

The valve record may comprise further fields, which may be based on information from the valve engineer via the mobile communication device and/or from the valve operator. The one or more further fields may comprise information about the size of the piping and/or the valve, the position of the valve, such as subterranean or not, installation depths, such as depth relative to ground level, installation date, contractor and/or installer name or ID, further photographs, such as photographs of galvanic protection, actuation, etc.

The valve record may also comprise one or more further fields comprising information about certificates, official approvals, historical event data, maintenance data, such as maintenance interval, time of next maintenance, time of last maintenance, accessibility, means of access, such as tools needed to access the valve, details about the connected piping, such as working pressure, piping material, materials transported by the piping, or supply data, e.g. addresses or facilities which may be affected when closing the valve.

The valve records may be comprised in the central database of an operator or a service provider or the valve records may also be exported to one or more decentral databases, e.g. a database of an operator.

FIG. 6 illustrates a graphical user interface (GUI) of a valve locator according to an embodiment of the invention. The valve locator comprises an number of input search fields SIF1 . . . SIF4.

The valve locator comprises a search engine communicatively coupled to a valve data base (not shown).

A search engine in the present context is a software system that is designed to search for information, typically the related valve database. In particular, the present search engine is a part of a valve locator, i.e. software running on a hardware platform, central or distributed. A very important and advantageous feature of the invention is that specific valve records may be searched and found upon user of search criteria other than its unique identity. Applicable search fields may e.g. include a valve type, a valve location, a user defined priority, a user defined category, etc. The valve records may be searched and extracted from the database for various purposes such as more emergency related events, e.g. a leakage in a known area, but also for more routine based planning of maintenance.

The input search fields may e.g. include a number field, a valve location field, a classification field, a valve type, a user defined priority, a user defined category or e.g. a mounting date or a mounting interval.

Now referring to FIG. 7, an embodiment of the invention is illustrated. A valve VLV, a mobile communication device DEV, and a central server CS are shown.

The valve VLV comprises a marking MA, which may in some embodiments be unique, whereas in other embodiments it may not be unique.

The marking MA is associated with an identity ID of the valve VLV. In embodiments, where the marking MA is unique, the unique marking MA may be associated with a unique identity ID of the valve VLV, or the unique marking MA may be associated with a type identity ID of the valve VLV, such as a model number or name.

The mobile communication device DEV comprises a navigation satellite signal receiver NSSR for receiving a navigation signal from navigation satellites. The mobile communication device DEV may by means of the navigation satellite signal receiver NSSR establish a valve location VL of the valve VLV.

The mobile communication device DEV comprises a camera CAM and/or an electromagnetic tag reader ETR, such as a reader for reading RFID tags or NFC tags.

The camera CAM or the electromagnetic tag reader ETR may read the marking MA of the valve VLV. Typically, if the marking MA is a graphical marking, the reading may be performed by the camera CAM. One example of a particularly advantageous two-dimensional graphical tag is QR codes. With respect to QR codes, the American patent document U.S. Pat. No. 5,726,435 A is hereby incorporated by reference.

Also, in some embodiments, the camera may establish a digital photograph DPH of the installed valve VLV.

The mobile communication device DEV comprises a data processing system PROC. In some embodiments, the reading of the marking MA may be decoded on the mobile communication device DEV, which is illustrated as optional, whereas in other embodiments a representation, such as a digital photograph, of the marking MA, is transmitted to the central server CS for decoding.

The mobile communication device DEV comprises a mobile device communication interface MDCI for transmitting wirelessly one or more data packages DP.

The central server CS comprises a central server communication interface CSCI for receiving the one or more data packages DP. It should be noted that the communication signal(s) comprising the one or more data packages DP may typically be relayed by one or more relay stations. Also, in many situations the communication signal from the mobile communication device DEV may be received at e.g. a cell tower and relayed through the internet. Therefore, the central server communication interface CSCI may be any communication interface for receiving the one or more data packages DP from a communication infrastructure.

The central server CS comprises in FIG. 7 a database DB. In some alternative embodiments, the database DB may be located external from the central server CS. The database DB, the content of which is illustrated by the shown matrix, comprises a number of valve records VR1, VR2, which are shown as horizontal rows in the matrix. The valve records VR1, VR2 comprises the identity ID1, ID2 of different valves VLV, optionally corresponding digital photographs DPH1, DPH2 of the respective valves VLV, the valve locations VL1, VL2. The valve records VR1, VR2 may also comprise further fields Fa1, Fa2, and Fb1, Fb2.

Further explanation of the embodiment is provided with the embodiment illustrated on FIG. 1, which discloses a method that may be carried out on the system illustrated on FIG. 7.

A further embodiment is illustrated on FIG. 8. A preliminary workflow list PWFL, an element from the workflow list PWFL, and a valve record VR are illustrated.

A mobile communication device (not shown) may provide to its user a preliminary workflow list PWFL, which may indicate to the user planned tasks to be performed, e.g. within the next day or week. The user may then choose a task to be carried out, or a task may be chosen for the user, e.g. based on relevance or date. Typically, the mobile communication device may then provide to the user a location, such as an address. When the user is at the location, the user may then, possibly after installing or inspecting a particular valve, perform the relevant steps illustrated in connection with FIG. 1, thereby providing an identity ID of the valve, a valve location VL, and, optionally, establishing a digital photograph DPH.

The identity ID, the valve location VL, optionally the digital photograph DPH, and said element WFLE from the preliminary workflow list is used to create the valve record VR. Preferably, the valve record VR is established by the central server CS.

In certain embodiments, the element WFLE from the preliminary workflow list may contain all the information pertaining to the particular task to be performed, however in other embodiments, only certain parts or elements thereof is selected.

Said element WFLE from the preliminary workflow list PWFL may comprise an intended location of the particular valve, information about the identity of the valve, use of the valve, classification of the valve, etc.

Now referring to FIG. 9, a further embodiment of the invention is illustrated.

A mobile communication device DEV, a central server CS, and a valve operator VO are illustrated.

The mobile communication device DEV, the central server CS, and the valve operator VO may preferably be adapted to function according to the embodiments of the previously described figures, particularly FIG. 1.

The mobile communication device DEV comprises a display DISP and a data processing system PROC.

The central server CS comprises a database DB and a data processing system PROC.

The valve operator VO comprises a display DISP and a data processing system PROC.

The mobile communication device DEV is adapted to communicate with the central server CS. Preferably, as illustrated, the communication may be two-way, but may alternatively be one-way from the mobile communication device DEV to the central server CS. Also the central server CS and the valve operator VO are adapted to communicate.

The mobile communication device DEV may preferably be adapted to allow the user to use the display DISP, to view the valve location VL, the marking MA and/or the identity associated therewith, and optionally a digital photograph DPH of the installed valve VLV, before approving these, and in some cases correcting these, before the valve location VL, the marking MA and/or the identity associated therewith, and optionally the digital photograph DPH are transmitted to the central server CS.

The central server CS establishes a valve record VR comprising the valve location VL, the marking MA and/or the identity associated therewith, and optionally the digital photograph DPH.

The valve record VR may be stored in the database DB of the central server CS and/or may be transmitted to the valve operator VO. At the valve operator VO valve records VR may be accessed by means of the display DISP and the data processing system PROC.

In some embodiments, the valve records VR are stored locally at the valve operator VO in a local database and may be accessed through that.

In some embodiments the valve records VR are stored in the central server CS and accessed from the valve operator VO.

In some embodiments, the valve records VR are stored in a database located externally from the valve operator VO, e.g. a cloud computing based database.

The invention claimed is:

1. Method of registering an installed valve, the installed valve having a marking associated to an identity, the method comprising the steps of
providing a mobile communication device, the mobile communication device comprising a navigation satellite signal receiver,
establishing a registration of the valve by performing the following steps with the mobile communication device,
reading the marking of the valve,
establishing a valve location by means of the navigation satellite signal receiver,
transmitting at least one location data package to a central server, said at least one data package comprising a representation of the marking or the associated identity and the established valve location as mounted and fixed to the pipe grid,
receiving at the central server said at least one data package,
establishing at the central server a valve record associating the identity to the established valve location, and
storing the valve record in a database;
wherein the installed valve is fixed to a pipe grid.

2. Method of registering an installed valve according to claim 1, wherein the reading of the marking of the valve involves an electromagnetic reading of an electromagnetically encoded marking.

3. Method of registering an installed valve according to claim 1, wherein the marking comprises an RFID tag or a Near Field Communication (NFC) electromagnetically encoded marking.

4. Method of registering an installed valve according to claim 1, wherein the mobile device comprises a camera and a navigation satellite signal receiver and wherein the method further comprises the steps of
establishing a digital photograph of the installed valve by means of the camera,
transmitting at least one location data package to a central server, said at least one location data package comprising a representation of the marking or the associated identity, the digital photograph of the valve, and the established valve location, and
receiving at the central server said at least one data package,
establishing at the central server a valve record associating the identity to the digital photograph of the valve and the established valve location.

5. Method of registering an installed valve according to claim 1, wherein the transmitting of at least one data package is initiated by a user and wherein the mobile communication device automatically upon said initiation by the user establishes the at least one data package to be transmitted.

6. Method of registering an installed valve according to claim 1, wherein the established valve location is automatically determined to be the last valid location determined on the basis of the signals received by the navigation satellite receiver.

7. Method of registering an installed valve according to claim 1, wherein the established valve location is automatically determined to be one of the last valid locations determined on the basis of the signals received by the navigation satellite receiver.

8. Method of registering an installed valve according to claim 1, wherein the established valve location is automatically determined to be calculated at least partly on the basis of signals received by the navigation satellite receiver subsequent to a signal fall out.

9. Method of registering an installed valve according to claim 1, wherein said marking is a unique marking.

10. Method of registering an installed valve according to claim 1, wherein the marking is decoded by the central server to establish said identity.

11. Method of registering an installed valve according to claim 1, wherein the central server in response to receiving said data package transmits an acknowledgement of receipt to the operator.

12. Method of registering an installed valve according to claim 1, wherein the valve location is converted to an address or location and transmitted to the user and/or the operator for a verification of the registered valve location.

13. Method of registering an installed valve according to claim 1, wherein the mobile communication device is a single unit comprising said camera and said navigation satellite signal receiver, the mobile communication device comprising programming for carrying out the steps performed by said mobile communication device under control of the user interface of the mobile communication device.

14. Method of registering an installed valve according to claim 1,
wherein at least one of the further fields comprises a user defined category.

15. Method of registering an installed valve according to claim 1, wherein at least one of the further fields comprises a mounting date.

16. Method of registering an installed valve according to claim 1, wherein the one or more data packages and/or the valve record established at least partly on the basis of the one or more data packages comprises information about corrosion protection of the valve.

17. Method of registering an installed valve according to claim 1, wherein the valve records stored in the database is encrypted.

18. Valve locator comprising a search engine and a valve database established according to claim 1,
the valve database comprising a plurality valve records,
the search engine being established for searching in said valve database,
the search engine comprising a number of search input fields,
the search input fields being associated to fields of said valve records,
at least one of the search input fields comprising valve location.

19. Mapping of a plurality of valves registered according to claim 1, the method comprising the step of on mapping the valve records or representations of the valve records on a geographical interactive map, the graphical interactive map including a valve filter, by means of which a user of the interface may establish a filter based on at least one parameter referring to the fields of the valve records of the database.

20. A system comprising a number of hardware components, the system executing the method according to claim 1.

* * * * *